May 17, 1966

J. W. WAGNER 3,251,594

SHEET FEED MECHANISM

Filed Sept. 30, 1964

INVENTOR
JOHN W. WAGNER

BY

ATTORNEYS

INVENTOR
JOHN W. WAGNER

May 17, 1966  J. W. WAGNER  3,251,594
SHEET FEED MECHANISM
Filed Sept. 30, 1964  8 Sheets-Sheet 4

INVENTOR
JOHN W. WAGNER
BY
ATTORNEYS

May 17, 1966  J. W. WAGNER  3,251,594
SHEET FEED MECHANISM
Filed Sept. 30, 1964  8 Sheets-Sheet 5

INVENTOR
JOHN W. WAGNER
BY
ATTORNEYS

May 17, 1966    J. W. WAGNER    3,251,594
SHEET FEED MECHANISM

Filed Sept. 30, 1964    8 Sheets-Sheet 6

INVENTOR
JOHN W. WAGNER
BY
ATTORNEYS

INVENTOR
JOHN W. WAGNER

May 17, 1966  J. W. WAGNER  3,251,594
SHEET FEED MECHANISM
Filed Sept. 30, 1964  8 Sheets-Sheet 8
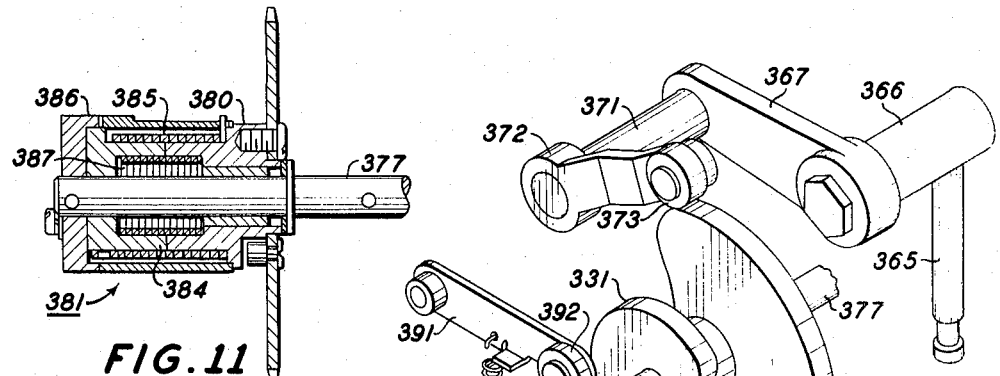
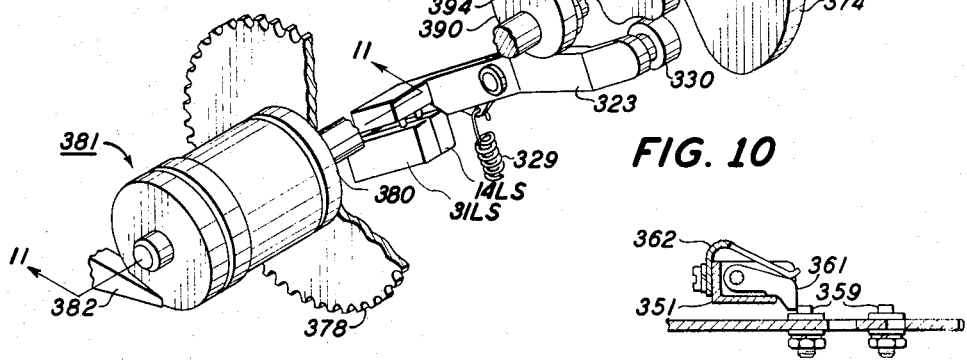
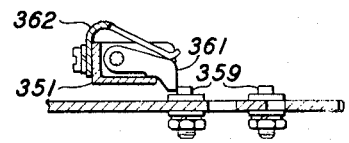
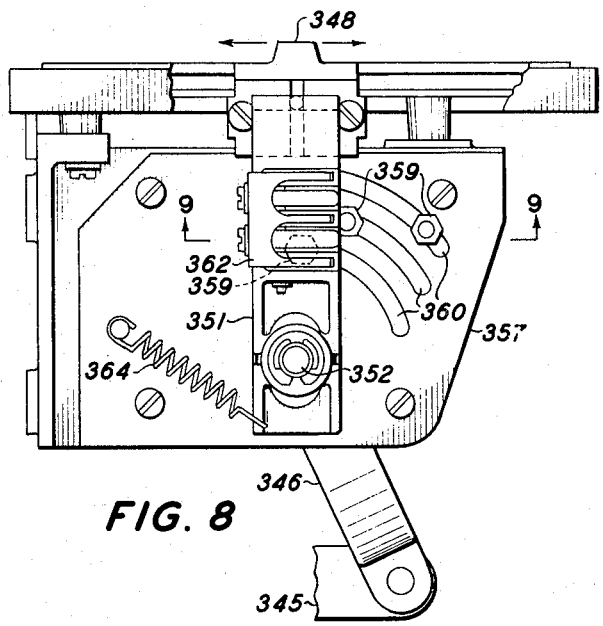
INVENTOR
JOHN W. WAGNER
BY
ATTORNEYS

United States Patent Office 3,251,594
Patented May 17, 1966

3,251,594
SHEET FEED MECHANISM
John W. Wagner, Penfield, N.Y., assignor to Xerox Corporation, Rochester, N.Y., a corporation of New York
Filed Sept. 30, 1964, Ser. No. 400,465
2 Claims. (Cl. 271—59)

This invention relates in general to xerographic apparatus or other copy apparatus and, in particular, to a paper stack adjusting device for achieving and maintaining a centered relation of the paper stack with respect to the processing elements of the xerographic apparatus or copying apparatus.

More specifically, the invention relates to an improved paper stack adjusting device for aligning and centering a stack of sheets on the paper supply tray of a sheet feed mechanism adapted to feed sheets of paper or similar material in succession from the stack.

In automatic xerographic reproducing machines of the type which include a xerographic drum onto which a xerographic powder image is formed, it is desirable to form the latent electrostatic image and, therefore, the xerographic powder image centrally on the xerographic drum. This has many advantages especially when using an optical system, including a lens, to project an image of the documents being reproduced onto the xerographic drum to form the latent electrostatic image. Accordingly, there exists the problem of centering the copy receiving sheets, such as paper, with respect to the images being formed on the xerographic drum in order to achieve a properly registered reproduction on the copy receiving sheets.

Various means have been employed in prior art sheet feed mechanisms to center and align stacks of support material, such as paper, but each of these prior art devices have been limited in their utility and flexibility to accommodate various size sheets of paper. It is noted that the latter requirement has become increasingly important in view of the use of copying machines of a single manufacture in various countries throughout the world because sheet sizes vary from country to country.

It is, therefore, the principal object of this invention to improve paper stack adjusting devices for supporting and aligning the side margins of a stack of sheets to center the sheets with respect to other elements associated therewith.

Another object of this invention is to improve paper stack adjusting devices for aligning the side margins of stacks of paper of various sizes, to be fed in succession from the top of the stack.

For a better understanding of the invention as well as other objects and further features thereof, reference is had to the following detailed description of the invention to be read in connection with the accompanying drawings, wherein:

FIG. 8 is a view taken along lines 8—8 of FIG. 3;

FIG. 9 is a sectional view taken along lines 9—9 of FIG. 8;

FIG. 10 is a perspective view of the drive system of the sheet feed mechanism;

FIG. 11 is a sectional view of the clutch taken along line 11—11 of FIG. 10.

General

Figure 1:
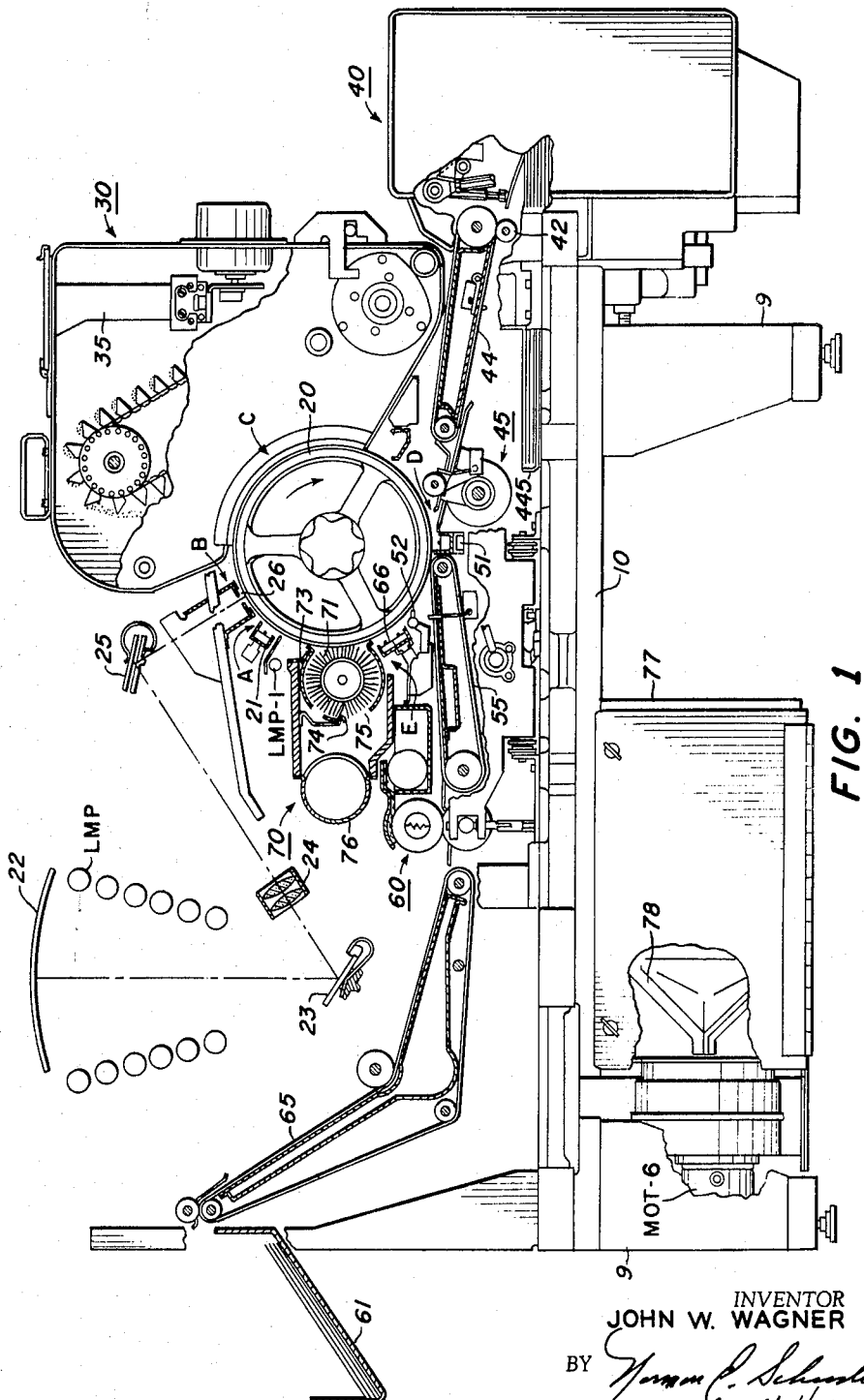
FIG. 1 illustrates schematically a xerographic apparatus using a sheet feed mechanism constructed in accordance with the invention.

As shown schematically in FIG. 1, the automatic xerographic reproducing apparatus comprises a xerographic plate 20 including a photoconductive layer or light-receiving surface on a conductive backing and formed in the shape of a drum, which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powdered image in the configuration of the copy being reproduced;

A transfer station, at which the xerographic powder image is electrostatically transferred from the drum surface to a transfer material or support surface; and A drum cleaning and discharge station, at which the drum surface is brushed to remove residual toner particles remaining thereon after image transfer, and at which the drum surface is exposed to a relatively bright light source to effect substantially complete discharge of any residual electrostatic charge remaining thereon.

The charging station is preferably located, as indicated by reference character A. As shown, the charging arrangement includes a corona charging device 21 which includes a corona discharge array of one or more corona discharge electrodes that extend transversely across the drum surface and are energized from a high potential source and are substantially closed within a shielding member.

Next subsequent thereto in the path of motion of the xerographic drum is an exposure station B. An optical scanning or projection system is provided to project a flowing image onto the surface of the photoconductive drum from a stationary original.

The optical scanning or projection assembly comprises a stationary copyboard which consists of a transparent curved platen member 22 such as, for example, a glass plate or the like, positioned on the exterior of the cabinet, which is adapted to support a document to be reproduced, the document being uniformly illuminated and arranged in light projecting relation to the moving light-receiving surface of the xerographic drum. Uniform lighting is provided by banks of lamps LMPS arranged on opposite sides of the copyboard. Scanning of the document on the stationary copyboard is accomplished by means of a mirror assembly which is oscillated relative to the copyboard in timed relation to the movement of the xerographic drum.

The mirror assembly, which includes an object mirror 23, is mounted below the copyholder to reflect an image of the document through a lens 24 onto an image mirror 25 which, in turn, reflects the image onto the xerographic drum through a slot in a fixed light shield 26 positioned adjacent to the xerographic drum surface.

Adjacent to the exposure station is a developing station C in which there is positioned a developer apparatus 30 including a casing or housing having a lower or sump portion for accumulating developer material. A bucket type conveyor is used to carry the developing material to the upper part of the developer housing where it is cascaded over a hopper chute onto the xerographic drum to effect development. A toner dispenser 35 is used to accurately meter toner to the developing material as toner particles are consumed during the developing operation.

Positioned next and adjacent to the developing station is the image transfer station D which includes a sheet feeding arrangement adapted to feed sheets of support material, such as paper or the like, successively to the xerographic drum in coordination with the presentation of the developed image on the drum surface at the transfer station.

The sheet feeding mechanism includes a sheet feed device 40 adapted by means of vacuum feeders to feed the top sheet, of a stack of sheets on a tray 41, to rollers 42 cooperating with the belts of paper transport 44 for advancing the sheet sufficiently to be held by paper transport 44 which in turn, conveys the sheet to a sheet registration device 45 positioned adjacent to the xerographic drum. The sheet registration device arrests and aligns each individual sheet of material and then in timed relation to the movement of the xerographic drum, advances the sheet material into contact with the xerographic drum in registration with a previously formed xerographic powder image on the drum.

The transfer of the xerographic powder image from the drum surface to the sheets of support material is effected by means of a corona transfer device 51 that is located at/or immediately after the line of contact between the support material and the rotating drum. In operation, the electrostatic field created by the corona transfer device is effective to tack the support material electrostatically to the drum surface, whereby the support material moves synchronously with the drum while in contact therewith. Simultaneously with the tacking action, the electrostatic field is effective to attract the toner particles comprising the xerographic powder image from the drum surface and cause them to adhere electrostatically to the surface of the support material.

Immediately subsequent to the image transfer station, there is positioned a stripping apparatus to paper pick-off mechanism 52 for removing the sheets of support material from the drum surface. This device, which is of the type disclosed in Rutkus et al. United States Patent 3,062,536, includes a plurality of small diameter orifices supplied with pressurized aeriform fluid by a suitable pulsator or other device. The pulsator is adapted to force jets of pressurized aeriform fluid through the outlet orifices into contact with the surface of the xerographic drum slightly in advance of the sheet of support material to strip the leading edge of the sheet from the drum surface and to direct it onto an endless conveyor 55 whereby the sheet material is carried to a fixing device 60. At the fixing device, the transferred xerographic powder image on the sheet of support material is permanently fixed or fused thereto as by heat. After fusing, the reproduction is discharged from the apparatus at a suitable point for collection externally of the apparatus by means of the conveyor 65. In the embodiment shown, the reproductions are discharged from conveyor 65 into a receiving tray 61.

The next and final station in the device is a drum cleaning station E, having positioned therein a corona preclean device 66, a drum cleaning device 70 adapted to remove any powder remaining on the xerographic drum after transfer by means of a rotating brush 71, and a discharge lamp LMP–1 adapted to flood the xerographic drum with light to cause dissipation of any residual electrical charge remaining on the xerographic drum.

To remove residual powder from the xerographic drum, there is disposed a cylindrical brush 71 rotatably mounted on an axle and driven by a motor, not shown. For collecting powder particles removed from the xerographic drum by the brush, there is provided a dust hood 73 that is formed to encompass approximately two-thirds of the brush area. To ensure thorough cleaning of the brush, a flicking bar 74 is secured to the interior of the dust hood adjacent the edge of the outlet duct 75 of the dust hood and in interfering relation with the ends of the brush bristles whereby dust particles may be dislodged therefrom.

For removing dust particles from the brush and dust hood, an exhaust duct 76 is arranged to cover the outlet of the dust hood, the exhaust duct being connected at its other end to the wall of a filter box 77 attached to the dust hood. A filter bag 78 is secured within the filter box, with the mouth of the filter bag in communication with the exhaust duct. Motor MOT–6 driven fan units, connected to the filter box, produces a flow of air through the filter box drawing air through the area surrounding the xerographic drum and the dust hood, the air entraining powder particles removed from the drum by the brush as the air flows through the dust hood. Powder particles are separated from the air as it flows through the filter bag so that only clean air reaches the motor unit.

Suitable drive means are provided to drive the drum, rotating mirror and sheet feed mechanism at predetermined speeds relative to each other, and to effect operation of the bucket-type conveyor and toner dispenser mechanism and the other operating mechanisms.

Referring now to the drawings, there is provided a frame for supporting the components of the apparatus formed by a base plate 10 supported on legs 9. Vertical outboard and inboard frame plates 11 and 12, respectively, are secured to base plate 10 in spaced relation to each other.

The xerographic drum 20 is mounted on a horizontal driven shaft and the drum is positioned between frames 11 and 12, with the major xerographic components of the machine mounted around the drum.

It is believed that the foregoing description is sufficient for the purposes of this application to show the general operation of a xerographic reproducing apparatus using a sheet feed mechanism constructed in accordance with the invention. For further details concerning the specific construction of the xerographic apparatus shown, reference is made to copending application, Serial No. 400,363, filed concurrently herewith on September 30, 1964, in the name of Robert F. Osborne et al.

*Sheet feed mechanism*

Referring now to the subject matter of the invention, the sheet feeding mechanism 40 used to separate the top sheets one at a time from the top of a stack or pile of sheets and to feed the sheets to the paper transport 44 may be formed as an integral unit of the reproducing apparatus, or as shown, may be formed as a separate unit connected to the frame of the reproducing apparatus.

Referring to FIGURES 2–11 there is shown a front frame plate 301 and a rear frame plate 302 connected together and maintained in spaced relation to each other by cross member 303 and tie rods 304. A stack or pile of sheets, indicated as 305, is supported on the movable tray or table 41 between the frame plates 301 and 302. The tray 41 has depending sides 306 extending downward to which are secured a pair of extension arms 307 carrying a pair of rollers 308. The rollers 308 are adapted to ride in guide channels 309 secured to frame plates 301 and 302. Thus, the tray 41 is movable in a vertical direction between the two frame plates 301, 302 and is guided in its vertical movement by the rollers 308 in the guide channels 309.

Figure 2:
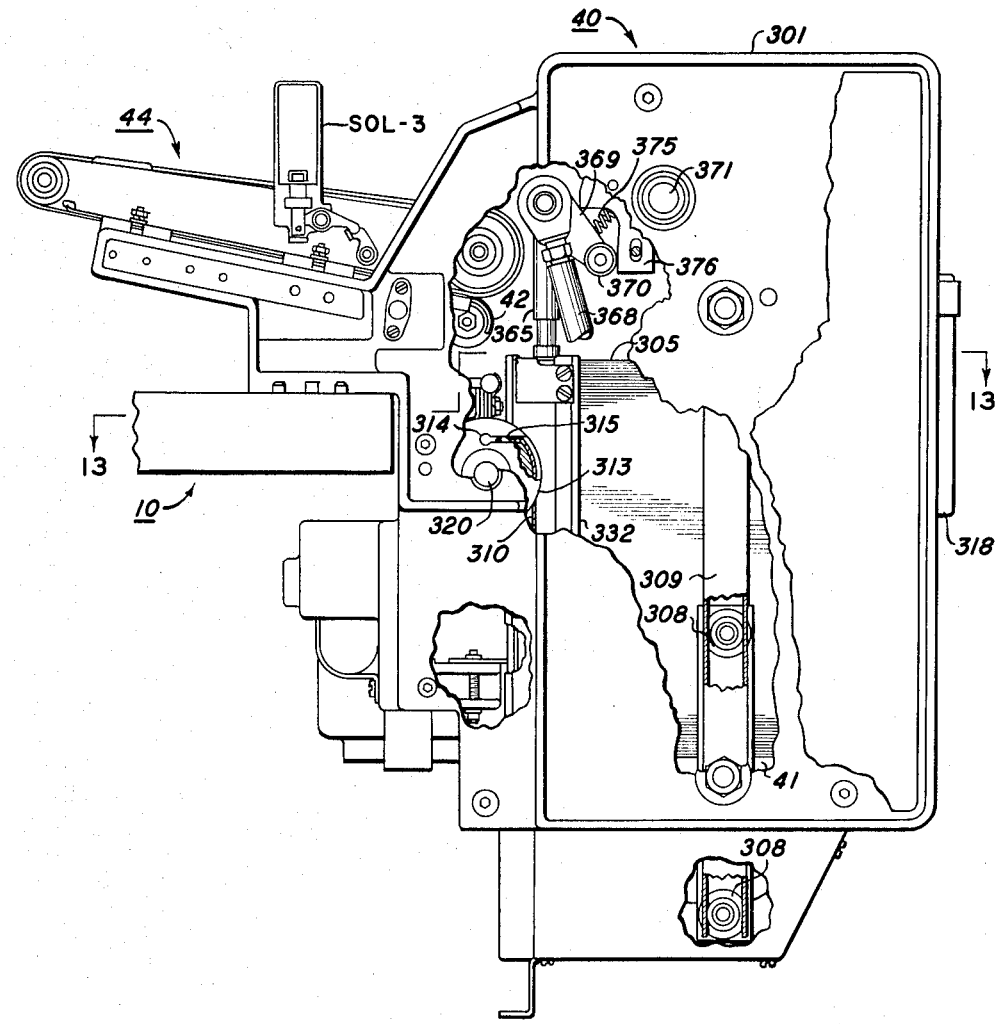
FIG. 2 is a front view of the sheet feed mechanism with portions broken away to show internal operation of the apparatus.
Figure 7:
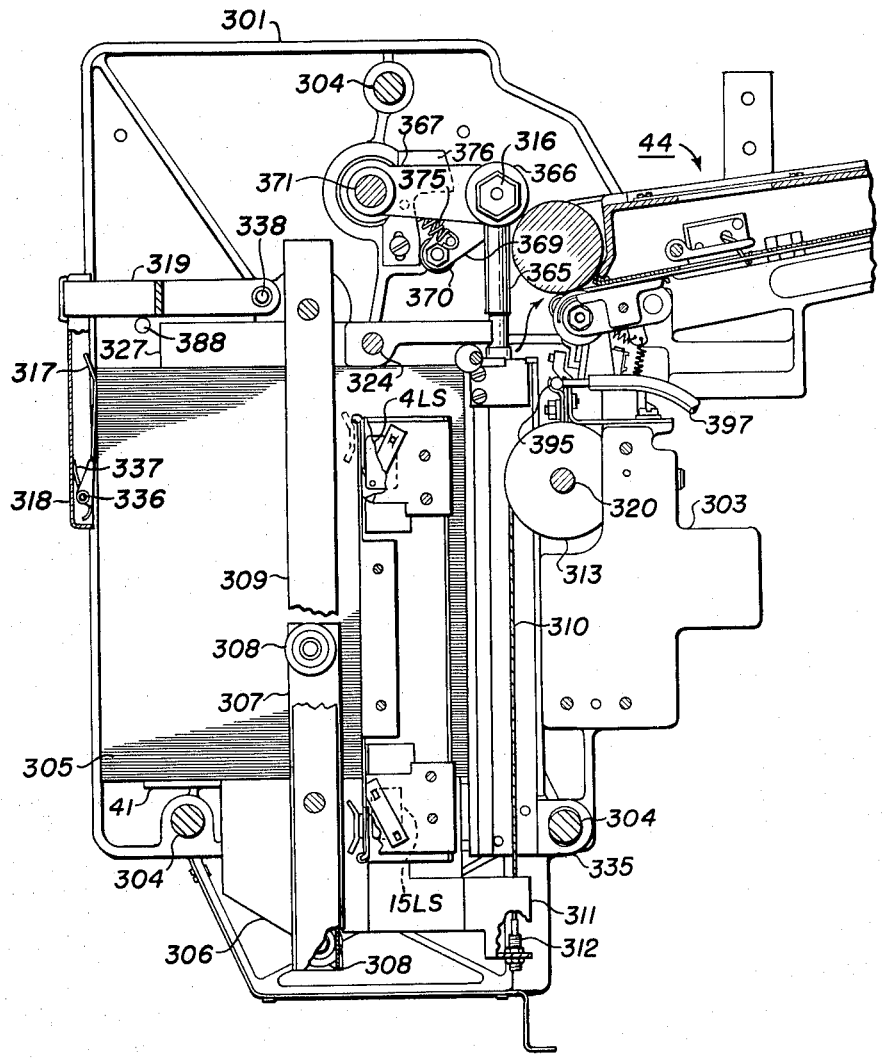
FIG. 7 is a sectional view of the sheet feed mechanism taken along lines 7—7 of FIG. 3.

The tray 41 is supported from a pair of cables 310 by means of brackets 311 secured to the tray sides 306. The cables 310 have one end secured to the brackets 311 by means of connectors 312, as seen in FIG. 7, and the other end secured to a pulley 313 by means of a bead 314 in a hole and slot 315 in the pulley 313, as shown in FIG. 2.

The pulleys 313 are fixed to a shaft 320 on opposite sides of the tray between plates 301 and 302. Shaft 320, journaled in suitable bearings mounted in the plates 301 and 302, is driven to raise or lower the tray by means of a gear 321 mounted on a portion of the shaft 320 which extends through the frame plate 302. Driving power is supplied to the gear 321 to rotate shaft 320 to raise and lower the paper tray 41 by a worm gear 322 on the drive shaft of an index motor MOT–1.

The index motor MOT–1 is connected to a source of electrical power and its operation controlled by index limit switch 14LS, down limit switch 15LS and index switch SW6, shown schematically in the wiring diagrams and described hereinafter. Down limit switch 15LS is secured to plate 302 in position to be actuated by the paper tray as it reaches its lower or bottom position.

The index limit switch 14LS and a tray up interlock switch 31LS are mounted in side by side relation on the outside of side frame 302, to be actuated by a switch actuating lever 323, pivoted at pin 324. An adjustable stop 325, mounted on the same bracket 326 as the switches 14LS and 31LS limits the movement of the lever 323 so that these switches are not damaged when the paper supply is excessively low or the tray is at the bottom of its downward movement. The function of tray up interlock switch 31LS is not described in detail since it forms no part of the subject invention.

The lever 323 is secured to the pin 324, and the pin 324 extends through the side frame plate 302. The opposite end of the pin 324 has the paper level sensing bar 327 secured thereto. The pin 324 is rotatably mounted in the frame plate 302 by means of a bearing 328 so that movement of the sensing bar 327 rotates the pin 324 and the lever 323. The opposite end of the sensing bar 327 is pivotally secured on a stub shaft, not shown, mounted in the side frame 301. The sensing bar is biased downward towards the top of the stack of sheets by a tension spring 329, mounted between the lever 323 and the switch bracket 326.

The opposite end of the lever 323 contains a cam follower 330 which is urged by the spring 329 against a cam 331. Rotation of the cam 331 raises and lowers the sheet sensing bar 327 by means of the lever 323 and pin 324. The movement of the cam 331 is timed with the movement of the sheet feeding so that the sensing bar 327 is raised from the sheet stack at the time the top sheet is fed; thus, the sensor does not interfere with the individual sheet feeding.

During operation of the sheet feeding mechanism, the sheet sensor 327 drops downward a distance sufficient to actuate switch 14LS by arm 323 after a predetermined number of sheets have been fed. The switch 14LS effects operation of the drive system described above to raise the entire sheet stack to the proper feeding level and to raise sensing arm 327 and, thus, releasing switch 14LS. During continued operation of the sheet feeder, the sheet stack is periodically indexed or raised to the feeding level so that the top of the stack is continuously in a position to feed sheets to the transport system.

In this particular apparatus, the sheet paper is fed edgewise to the xerographic reproducing machine. Therefore, the stack of sheets is arranged on the tray 41 with its longer dimension being transverse to the direction of movement of the sheet material.

The stack is aligned on the tray by means of a pair of adjustable guides 332, located at the leading edge corners of the sheet stack. The top of each guide 332 has a snubber 333 extending over the stack to retain the upward movement of the stack. In order to accommodate various size sheets, the guides 332 are adjustable to various positions in the direction of the length of the sheet stack. For example, the guides 332 would be at one position when 8" x 10" sheets are being fed and at different positions when 8½" x 11" or 8½" x 13" sheets are being fed. The guides are slidably mounted on the shaft 320 by a pair of bearing blocks 334 and are slidably guided by brackets 335 on a bottom tie rod 304. The guides 332 are urged outward by a compression spring 340, mounted between the bearing blocks 334 with the shaft 320 serving as an internal spring guide. The guides in the bearing blocks can be urged inward towards each other by means of a pair of levers 341 pivotally attached at one end to the bearing blocks 334. The other end of the outboard lever is pivotally connected to a connector bar 342 and the other end of the inboard lever is pivotally connected to crank arm 344. The connector bar 342 is secured to a pin 343 which is journaled in the cross frame member 303. Rotation of the pin 343 is effected by a crank arm 344 secured to the pin and pivotally connected to a connector lever 345. Movement of the connector lever 345 actuates the crank arm 344 which in turn rotates the pin 343 and the connector bar 342. Movement of the connector bar 342 pulls the levers 341 and the bearing blocks 334 either inward against the action of the compression spring 340 or outward with the action of the compression spring 340. The bearing blocks slide along the shaft 320 and carry the brackets 335 along the tie rod 304.

The connector lever 345 extends outward through the rear frame plate 302 terminating at a pivotal connection with a second crank arm 346. Movement of the lever 345 is limted by an adjustable stop 347 which abuts the rear frame plate 302.

Figure 3:
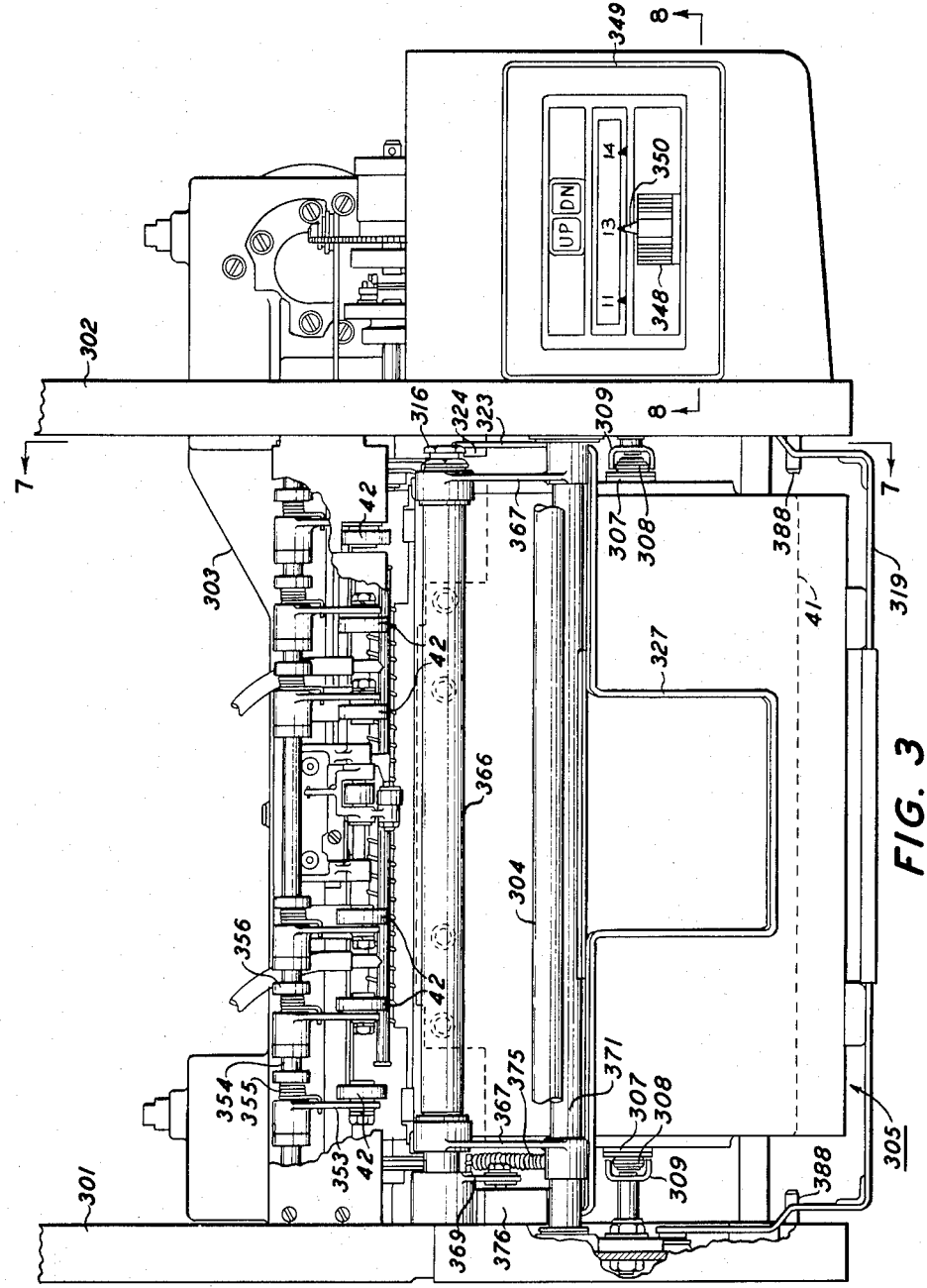
FIG. 3 is a top view of the sheet feed mechanism shown in FIG. 2.
Figure 4:
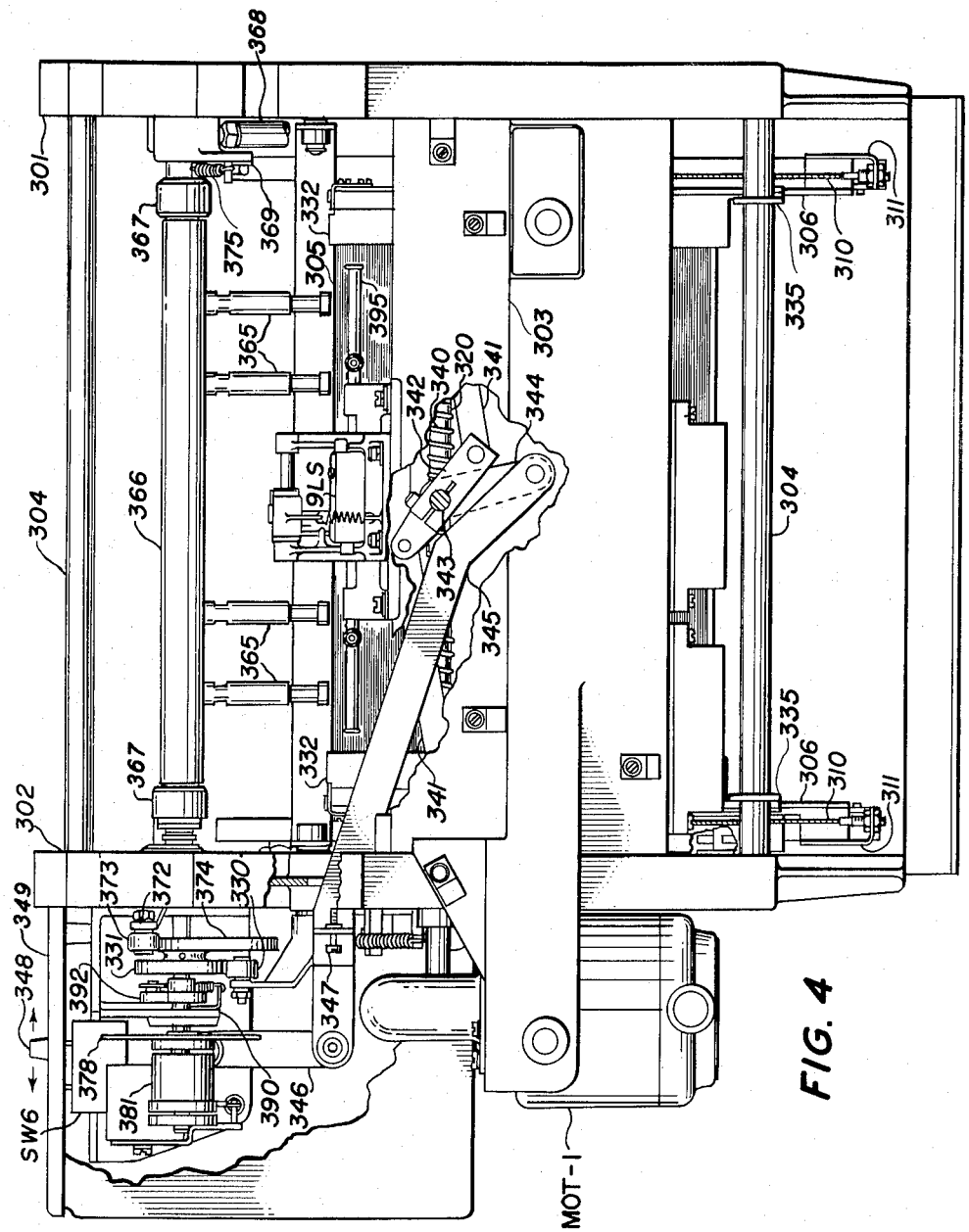
FIG. 4 is a left side view of the sheet feed mechanism shown in FIG. 2 with portions broken away to show internal portions of the apparatus.
Figure 5:
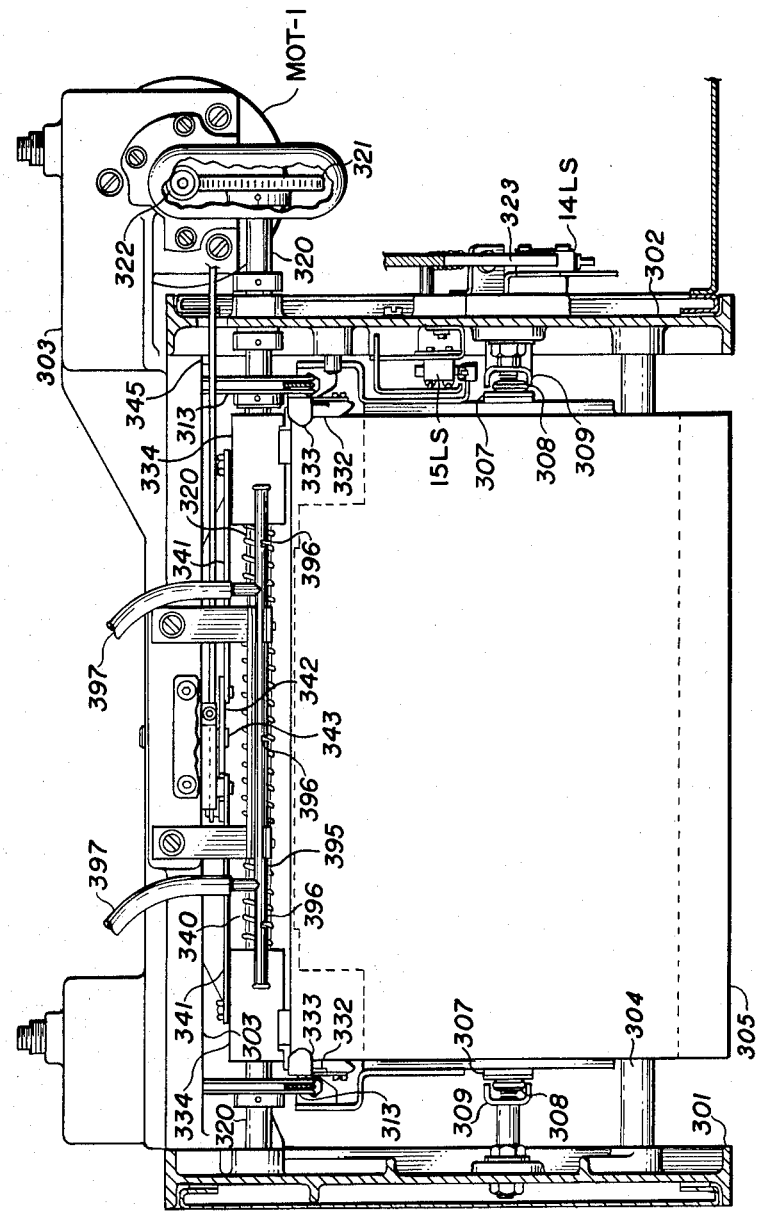
FIG. 5 is a sectional view of the sheet feed mechanism taken along lines 5—5 of FIG. 2.
Figure 6:
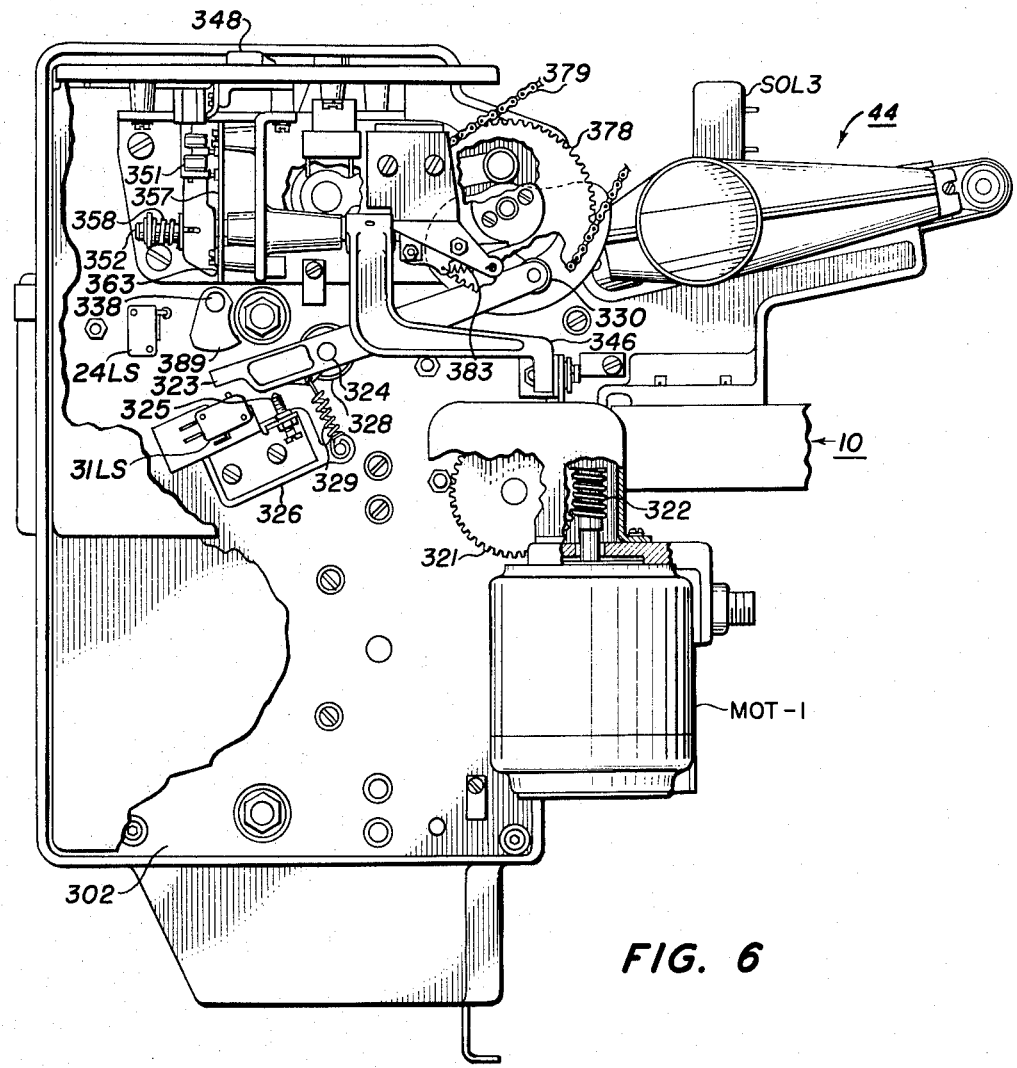
FIG. 6 is a rear view of the sheet feed mechanism with the cover panel broken away to shown the internal elements of the mechanism.

Positioning of the paper stack guides 332 to accommodate the appropriate size paper being fed is accomplished by the operator by manually moving knob 348 located on the control panel 349. The knob 348 may be manually moved across the control panel, as seen in FIG. 3, until the pointer 350 indicates the appropriate size paper to be fed. The knob 348 is secured to a paper guide positioning arm 351 which is mounted on a shaft 352 and secured thereto to produce rotational movement of the shaft. The arm 351 is slidable along the shaft and is urged towards a limit plate 357 by means of compression spring 358. The crank arm 346 is also secured to the shaft 352 so that movement of the knob 348 and the positioning arm 351 produces rotational movement of crank arm 346. In turn, crank arm 346 produces lateral movement of lever 345 and positioning of the guides 332.

The limit plate 357 provides positive stopping positions for the paper width indicator or knob 348. The limit plate has adjustable stops 359 located in a series of arcuate grooves 360 in the plate. A pawl 361 is mounted on the positioning arm 351 to cooperate with the stops 359. The pawls are urged towards the plate 357 by a clip 362 so that they abut the stops 359 upon movement of the arm 351. The stops 359 are positionable within the grooves 360 so that the position of the paper guides 332 may be adjusted according to the size of the paper expected to be used in the machine. As the arm 351 is moved from left to right, as seen in FIG. 8, a pawl 361 abuts the first stop 359 that it encounters. If this is the size of paper being used as indicated on an indicator dial on control panel 349, then movement of the knob 348 stops at this point. However, if it is a different size paper that is to be fed, then the knob 348 is moved towards the operator, that is, towards the left in FIG. 3, and the arm 351 pivots about point 363 against the action of spring 358 so that a pawl 361 is lifted over the stop 359. With the return of the knob 348 to its original position, continued movement is possible until subsequent stops are encountered by a pawl 361. When the knob 348 and arm 351 are returned to their original position the pawls 361 are deflected by stops 359 against the action of springs 362 so that the pawls ride over the stops 359. A tension spring 364, connected between the plate 357 and the arm 351, aids in the movement of the arm 351 and holds the arm against the stops 359.

The rear margin of the stack of paper on the tray 41 is aligned by deflectors 317 which are positioned to contact the trailing edge of the stack lightly to hold the paper in position on the tray. The deflectors 317 are pivotally secured to the depending supports 318 of bracket 319 by pins 336. Each deflector is normally biased outward from the depending supports, in a clockwise direction as seen in FIGURE 7, by a coil spring 337. Each spring 337 encircles a pin 336 with one end of the spring butting against the deflector and the opposite end of the spring butting against the depending support.

Stub shafts 338, fixed to the ends of the bracket, are journaled in frame plates 301 and 302 to permit this entire assembly to be rotated out of the position shown in FIGURE 16 to facilitate loading of paper onto the tray. Movement of this assembly in a counterclockwise direction is limited by stop pins 388 extending from the frame plates 301 and 302.

A cam 389 is fixed to the opposite end of one of the stub shafts to actuate an interlock switch 24LS mounted on frame 302, when the assembly is raised to permit loading of paper onto the tray.

With the sheet stack adjusted to the proper height and the guides positioned according to the size of the paper by the above-described mechanism, the sheets may be seriatim fed from the top to the paper transport 44.

The sheet separating mechanism for separating the top sheet from the stack includes a number of suction feet 365 which by suction pick up the topmost sheet and advances the sheet between the idler rolls 42 and the belts of the paper transport system 44.

Each suction foot 365 comprises a hollow tube secured at one end to hollow manifold tube 366 journaled at opposite ends and pivot arms 367. One end of the tube 366 is sealed and has a suitable limiting valve 316 to control the suction pressure, and the opposite end of the tube is connected to it by a flexible conduit 368 to the inlet of a vacuum pump, not shown. A cam follower arm 369, carrying cam follower 370 is also secured to the manifold tube 366. The opposite ends of pivot arms 367 are secured to rock shaft 371 journaled in plates 301 and 302.

The shaft 371 extends through the side frame 302 and has secured thereon a cam follower arm 372 which imparts a rocking motion to the shaft as the cam follower 373 is actuated by cam 374.

The rocking of the rock shaft 371 will cause the outer ends of pivot arms 367, carrying manifold tube 366, to travel in an arc. As this happens, the cam follower 370 on cam follower arm 369 which is biased by spring 375 into engagement with a cam plate 376, secured to side frame member 301.

The cam plate 376 has a substantially vertical guide surface terminating in a horizontal guide surface so that as the follower 370 traces a path along the vertical and then the horizontal guide surfaces, the rock shaft 371 will rotate in a counterclockwise direction as seen in FIG. 7. The lower ends of the suction feet will be raised from a position in contact with the topmost sheet upward as the cam follower engages the vertical guide surface of the cam plate 376. Continued rocking motion of the rock shaft will cause the suction feet to rotate about the axis of manifold tube 366 towards the idler rolls 42 and the belts of the paper transport 44 as the cam follower moves along the horizontal guide surface.

Operation of the suction paper feet and the raising of the sensing arm 327 is effected and synchronized by having a rigid connection between the two cams 331 and 374. This is affected mounting these two cams on shaft 377. A gear 378, driven by chain 379 from a suitable drive motor, not shown, is rotatably mounted on the shaft 377 and is secured to a first plate or drum 380 of a clutch 381. The clutch 381 is of the type which has a second plate or drum 384 secured to the rotating shaft and a coil spring 385 around both drums. When the movement of the spring is unrestricted, the diameter of the spring is in driving contact with the two drums so that the shaft is rotated. When rotational movement of the coil spring is restrained the inner diameter of the spring disengages both drum surfaces and driving action stops. In the present embodiment, as shown in FIGS. 10 and 11, a pawl 382, which is biased towards the clutch 381 by spring 383, is solenoid actuated to restrain the movement of the clutch spring 385 by catching an indentation in spring retaining sleeve 386. The operation of the paper feed solenoid SOL-1 is described hereinafter under machine operation. When the clutch 381 is actuated by disengagement of the pawl 382 from sleeve 386, the gear 378, which is continuously rotating, serves to drive the shaft 377 and rotate the cams 331 and 374. Since the cams 331 and 374 are directly connected, the operation of the suction sheet feeder and the sheet level sensing arm are synchronized. The solenoid SOL-1 immediately releases the pawl 382 after it is disengaged from the sleeve 386, and the spring 383 returns the pawl to a position against the clutch 381 so that after one revolution the pawl again engages the sleeve 386. Thus, the clutch is essentially a one revolution clutch. There is a second internal coil spring 387 which permits one directional movement of the clutch so that the pressure of the cam followers on the cam cannot produce overriding of the shaft.

In order to insure that the suction feet 365 starts from the same position on each cycle a third cam 390 is mounted on shaft 377. A cam follower arm 391 and a cam follower 392 are biased against the cam 390 by a tension spring 393 and acts as a break to stop the rotation of shaft 377 with the suction feet 365 in position to start the next cycle. As the clutch 381 rotates the shaft 377 through one cycle, the cam follower 392 drops into an indentation 394 in the cam 390 and stops rotation of shaft 377. When the cycle is started the initial driving force from gear 378 is sufficient to rotate the cam 390 forcing the follower 392 out of the indentation.

Referring again to the separation of single sheets from the stack, the pressure side of the vacuum pump is connected by conduits 397 to manifold conduit 395 positioned near the leading edge of the stack of sheets. Apertures 396, in the manifold conduit directs air under pressure towards the leading edges of the topmost sheets of the stack whereby these sheets are loosened from each other to precondition the sheets for removal by the suction feet. When the suction feet 365 are in contact with a sheet, air is drawn in through valve 316 to this pump.

The idler rolls 42, which cooperate with the belts of paper transport 44, are rotatably mounted on arms 353 journaled on shaft 354 which is secured against rotation between frame plates 301 and 302. Each of the arms 353 is biased by a torsion spring 355 to yieldingly force the idler roll with which it cooperates against the surface of a belt or against a sheet sandwiched therebetween. One end of each torsion spring is secured to a spring retaining collar 356 fixed to shaft 354 and the other end of each spring is secured to the arm 353 with which it coacts.

It is apparent that the stack adjusting device disclosed can readily adjust to accommodate any size paper, and, although only three stops have been shown for appropriate setting to accommodate three different sizes of paper, additional stops could be used to provide settings for other sizes of paper.

While the invention has been described with reference to the structure disclosed herein, it is not to be confined to the specific details set forth or to the specific environment set forth, as, for example, it is apparent that the apparatus may be used in other type devices to effect sheet registration. Other modifications or changes may readily become apparent to those skilled in the art, and, therefore, this application is intended to cover such modifications or changes as may come within the purposes of the improvements on the scope of the following claims.

What is claimed is:

1. In combination with a reproducing apparatus having a rotary drum and a sheet feed mechanism including a tray adjacent one side of the drum for supporting a stack of sheets in position for movement seriatim into contact with the drum; an improved stack adjusting device for aligning the edges of the sheets and to center the stack on the tray including;

transverse guide means mounted adjacent said tray at right angles to the path of paper travel;

a pair of edge margin guide members mounted on said transverse guide for sliding movement transversely of said tray;

traversing means for simultaneously moving said edge margin guides to and fro with respect to the longitudinal center line of said tray, said traversing means including a connector bar pivotally mounted for movement about a horizontal axis disposed in the vertical plane of said longitudinal axis of said tray, a pair of levers each pivotally connected at one end to said connector bar at equally spaced distance from the pivotal axis of said connector bar, the opposite ends of said levers being connected to said edge margin guide members so that the distances between the points of connection of each of said levers is equal;

spring means positioned on said transverse guide means to normally bias said edge margin guides apart from each other;

a control lever pivotally mounted for movement about a horizontal axis;

link means pivotally connected to said control lever and connected to said connector bar for rotating said connector bar to effect movement of said edge margin guides;

stop means adjustably positioned adjacent said control lever; and releasable latch means mounted on said control lever in position to engage said stop means to limit the movement of said control lever.

2. In combination with a reproducing apparatus having a rotary drum and a sheet feed mechanism including a tray adjacent one side of the drum for supporting a stack of sheets in position for movement seriatim into contact with the drum; an improved stack adjusting device for aligning the edges of the sheets and to center the stack on the tray including;

a first transverse guide and a second transverse guide mounted adjacent said tray at right angles to the path of paper travel;

a pair of edge margin guide members mounted on said transverse guides for sliding movement transversely of said tray;

traversing means for simultaneously moving said edge margin guides to and from with respect to the longitudinal center line of said tray, said traversing means including a connector bar pivotally mounted for movement about a horizontal axis disposed in the vertical plane of said longitudinal axis of said tray, a pair of levers each pivotally connected at one end to said connector bar at equally spaced distance from the pivotal axis of said connector bar, the opposite ends of said levers being connected to said edge margin guide members so that the distances between the points of connection of each of said levers is equal;

spring means encircling said first transverse guide to normally bias said edge margin guides apart from each other;

a control lever pivotally mounted for movement about a horizontal axis;

link means pivotally connected to said control lever and connected to said connector bar for rotating said connector bar to effect movement of said edge margin guides;

at least a first stop means and a second stop means adjustably positioned adjacent said control lever at predetermined positions relative to each other; and releasable latch means mounted on said control lever in position to engage said first stop means or said stop means to limit the movement of said control lever, and therefore, the movement of said margin guides from a first position as limited by said first stop means to a second position as limited by said second stop means.

References Cited by the Examiner

UNITED STATES PATENTS 3,022,998   2/1962   Patalon _____ 271—59 X
3,061,303   10/1962  Glaser _____ 271—59 X M. HENSON WOOD, Jr., *Primary Examiner.*

J. N. ERLICH, *Assistant Examiner.*